United States Patent [19]

Kato et al.

[11] Patent Number: 4,835,385

[45] Date of Patent: May 30, 1989

[54] METHOD OF MEASURING SECTIONAL SHAPE AND A SYSTEM THEREFOR

[75] Inventors: Makoto Kato, Kawasaki; Tetsuo Yokoyama, Tokyo; Toshihiro Furuya, Katsuta, all of Japan

[73] Assignee: Hitachi, Ltd., Tokyo, Japan

[21] Appl. No.: 76,216

[22] Filed: Jul. 22, 1987

[30] Foreign Application Priority Data

Jul. 25, 1986 [JP] Japan .................................. 61-174917

[51] Int. Cl.$^4$ ............................................. H01J 26/27
[52] U.S. Cl. ................................. 250/310; 250/306; 250/307; 250/492.2; 250/560; 356/384
[58] Field of Search ............ 250/310, 306, 307, 492.2, 250/572, 563, 560; 356/375, 384, 387

[56] References Cited

U.S. PATENT DOCUMENTS

| | | | |
|---|---|---|---|
| 3,329,813 | 8/1967 | Hashimoto | 250/310 |
| 4,588,890 | 5/1986 | Finnes | 250/307 |
| 4,670,652 | 6/1987 | Ichihashi et al. | 250/310 |
| 4,725,730 | 2/1988 | Kato et al. | 250/307 |
| 4,733,074 | 3/1988 | Kato et al. | 250/307 |
| 4,740,693 | 4/1988 | Nakayama et al. | 250/305 |

FOREIGN PATENT DOCUMENTS 59-54160  3/1984  Japan .................... 250/310

OTHER PUBLICATIONS

Lebiedzik et al, "Multiple Detector Method for Quantitative Determination of Microtopography in the SEM", Scanning Electron Microscopy/Proceedings of the Eighth Annual Scanning Electron Microscope Symposium, Apr. 1975, pp. 181-187.

Suganuma, Tadao, "Measurement of Surface Topography Using SEM with Two Secondary Electron Detectors", J. Electron Microsc. vol. 34, No. 4, 328-337, 1985.

*Primary Examiner*—Carolyn E. Fields
*Assistant Examiner*—John A. Miller
*Attorney, Agent, or Firm*—Antonelli, Terry & Wands

[57] ABSTRACT

A method and system for measuring sectional shape to system the sectional shape of a subject on a plane that includes a direction that couples light sources or detectors, relying upon intensities of the same subject taken or irradiated from one direction wherein a calculation is carried out using a function that is not affected by the change of surface material of the subject in order to find a gradient component of a surface element in the direction which couples the light sources or the detectors, and the sectional shape of the subject on a plane that includes the direction coupling the light sources and the surface element, is determined relying upon the gradient component, making it possible to correctly obtain the sectional shape even when there exist different materials on the subject. Distortion in the measured result caused by the shadow of the surface topography is corrected by repeating the procedure; i.e., (1) estimating the shadow produced by the calculated sectional shape, (2) estimating the signals of when the shadow is removed, and (3) calculating the sectional shape from the signals from which effect of the shadow has been removed. Therefore, the sectional shape is obtained correctly even when there exists great unevenness on the surface of the subject.

18 Claims, 3 Drawing Sheets

METHOD OF MEASURING SECTIONAL SHAPE AND A SYSTEM THEREFOR

BACKGROUND OF THE INVENTION

1. Field of the Invention

The present invention relates to a system for measuring sectional shape of a specimen surface. More specifically, the invention relates to a method of measuring sectional shape maintaining high precision in the measurement of a sectional shape of a specimen using a scanning electron microscope (hereinafter referred to as "SEM") without being affected by differences in the material of specimen, by an edge effect or by a shadow formed on an uneven surface of the specimen, and further relates to a system therefor.

2. Description of the Prior Art:

It has recently been attempted extensively to reconstruct a surface shape based upon the brightness information of an image. One of the examples using SEM is found in the Journal of Electron Microscopy, "Measurement of Surface Topography Using SEM with Two Secondary Electron Detectors", Vol. 34, No. 4, 1985, pp. 328-337.

According to this system, two detectors are attached to the SEM, and the gradient on one line is detected, i.e., a differentiated value is found in a direction which couples the detectors, and is integrated from the end to find the sectional shape on the line, by utilizing the relationship that the difference between square powers of the two signals of the detectors varies nearly in proportion to the gradient component in the direction which couples the detectors of the surface elements.

If signals of the right side and left side detectors are denoted by $I_R$ and $I_L$, signals of the right and left detectors of a flat part used as normalization values are denoted by $I_{Rn}$ and $I_{Ln}$, and a constant for correction of nearly 1 is denoted by k, then the gradient A of the surface element is given by $$A = k \frac{I_L^2 - I_R^2}{(I_{Ln} + I_{Rn})^2} \quad (1)$$

Here, the direction coupling the detectors is represented by an X-axis, the direction that meets at right angles therewith on the sample surface is represented by a Y-axis, and the direction of height is represented by a Z-axis. If a gradient at a point X=j is $A_j$ when a line $Y=Y_O$ is being scanned, the height $Z_j$ of X=j is given by the following equation.

$$Z_j = Z_0 + \tfrac{1}{2} \sum_{m=0}^{j-1} (A_m + A_{m+1}) \quad (2)$$

Between the SEM and a general optical system, the direction of an electron gun can be corresponded to the viewing direction or the direction of an imaging system, and the direction of the detectors can be corresponded to the direction of a light source. That is, the path consisting of electron gun→specimen→detector in the SEM can be replaced by imaging system←specimen←light source being corresponded to the direction in which light travels that is just opposite to the direction in which the electrons travel. Therefore, when the image is picked up using the light sources in a direction in which they are opposed to each other, the same processing as the above processing can be effected relying upon two brightnesses at the same point.

In the above-mentioned conventional art, however, consideration had not been given to the case where different materials exist on the specimen or peculiar effects are exhibited depending upon the shape, or in regard to the change of the values $I_R$ and $I_L$ due to the formation of shadow caused by an uneven surface of the specimen.

According to the above-mentioned conventional art, a shadow forms on the specimen surface when different materials exist on the specimen, when there exists a peculiar effect in the brightness at a characteristic point such as an edge, or when there exists great unevenness on the specimen; i.e., the right and left detectors produce different signals making it difficult to obtain a correct gradient component. As a result, the sectional shape is obtained incorrectly.

SUMMARY OF THE INVENTION

The present invention was achieved in view of the above-mentioned circumstances, and its first object is to provide a system for measuring sectional shape which is capable of correctly measuring the sectional shape even when different materials exist on the specimen or even when there exists a peculiar shape such as an edge. The second object of the invention is to provide a system for measuring sectional shape which is capable of correctly measuring the sectional shape even when there exists great unevenness in the surface of the specimen.

To achieve the above-mentioned first object, the present invention deals with a method of measuring sectional shape to find the sectional shape of a sub or specimen on a plane that includes a direction that couples light sources, or detectors relying upon image intensities of the same subject irradiated or taken from one direction, wherein a calculation is performed using a function that is not affected by the change of surface material of the subject or specimen in order to find a gradient component of a surface element in the direction which couples the light sources or the detectors, and the sectional shape of the subject on a plane that includes the direction coupling the light sources or the detectors and the surface element is found relying upon the gradient component.

In order to achieve the above-mentioned second object, furthermore, the present invention deals with a method of measuring sectional shape, wherein distortion in the measured result caused by the shadow of the surface topography is corrected by repeating the procedure of the following three steps:

(1) estimate the shadow produced by the calculated sectional shape;

(2) estimate the signals when the shadow is removed; and (3) calculate the sectional shape from the signals from which effect of the shadow has been removed.

DETAILED DESCRIPTION OF THE PREFERRED EMBODIMENTS

Figure 1:
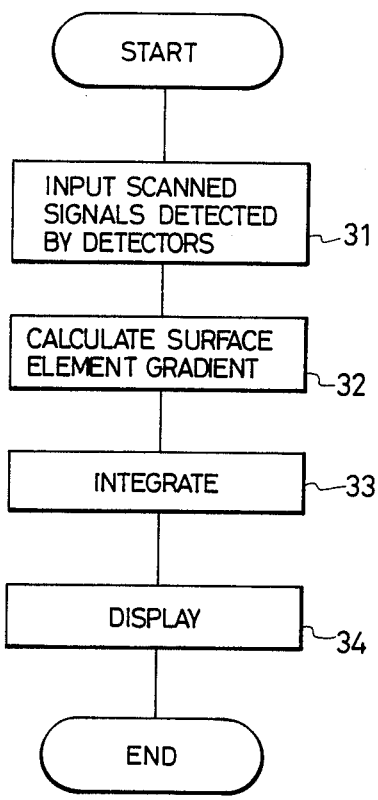
FIG. 1 is a flow chart of the processing according to a first embodiment of the present invention.

In a first system for measuring sectional shape according to the present invention, the equation for calculating the gradient A of the surface element relying upon the signals $I_R$ and $I_L$ is expressed in the form of a function of two brightnesses for the same point, in the form of a rationally homogeneous equation or a function thereof, in order to remove the effect caused by the presence of different materials or a peculiar shape. This will be explained hereinbelow.

In general, the signals $I_R$ and $I_L$ are expressed as products of an index of reflection of a material or an emission rate G of electrons and functions $F_R$, $F_L$ of relative angles of the viewing direction and the direction of a light source in the direction normal to the surface element, i.e., $$I_R = G \times F_R \qquad (3)$$

$$I_L = G \times F_l \qquad (4)$$

The equation for calculating the gradient A of the surface element is represented, for example, by the following rationally homogeneous equation, $$A = k \frac{I_L - I_R}{I_L + I_R} \qquad (5)$$

If the above relations (3) and (4) are substituted, there is obtained the following equation which does not contain G, $$A = k \frac{F_R - F_L}{F_R + F_L} \qquad (6)$$

That is, the equation for calculating the gradient of the surface element is free from the effect of material. It is also considered that the effect for a peculiar shape such as edge effect is caused solely by G but not caused by $F_R$ or $F_L$. In the same manner, therefore, this effect can be removed by obtaining a rationally homogeneous equation.

In addition to the above-mentioned equation (5), there can further be employed the following rationally homogeneous equations.

$$A = k \frac{I_L{}^2 - I_R{}^2}{I_L{}^2 + I_R{}^2} \qquad (7)$$

$$A = k \frac{I_L - I_R}{\sqrt{I_L \cdot I_R}} \qquad (8)$$

According to a second system for measuring sectional shape of the present invention, the sectional shape affected by the shadow is once calculated, and then the distortion caused by the shadow is corrected. The details will be described hereinbelow.

According to the conventional system mentioned in the foregoing, the gradient component is found in a direction that couples the detectors of the surface elements relying upon signals of the right and left detectors under an ideal condition where no shadow is formed by the peripheral unevenness of the surface element, and the gradient components are integrated to find the sectional shape.

If the signals without shadow can be estimated, the sectional shape can be correctly calculated relying upon the same system.

In practice, however, the kind of shadow that will be formed cannot be correctly estimated unless the sectional shape is correctly grasped. This dilemma can be solved by repeating the calculation as will be described below, and by asymptotically calculating the sectional shape.

First, the sectional shape distorted due to shadow is not quite another thing from the true sectional shape. Therefore, the shadow on the specimen surface calculated from the sectional shape relying upon the optical system or the imaging principle of the SEM, resembles to some extent the shadow that is practically formed.

Therefore, the signals including shadow obtained from the detectors are corrected utilizing the knowledge of shadow that is calculated. That is, if it is estimated that the signal of the left detector at a given point is increased by W times due to the shadow, then the signal of the left detector at that point is divided by W to prepare a correction signal that will be used in its place.

Though this correction is not perfect, the sectional shape calculated using the correction signal is much closer to the true value. The procedure is repeated starting from the calculation of the shadow based upon the imaging principle using the calculated sectional shape, to obtain an asymptotically corrected sectional shape.

An embodiment of the invention will now be described in detail in conjunction with the accompanying drawings.

Figure 2:
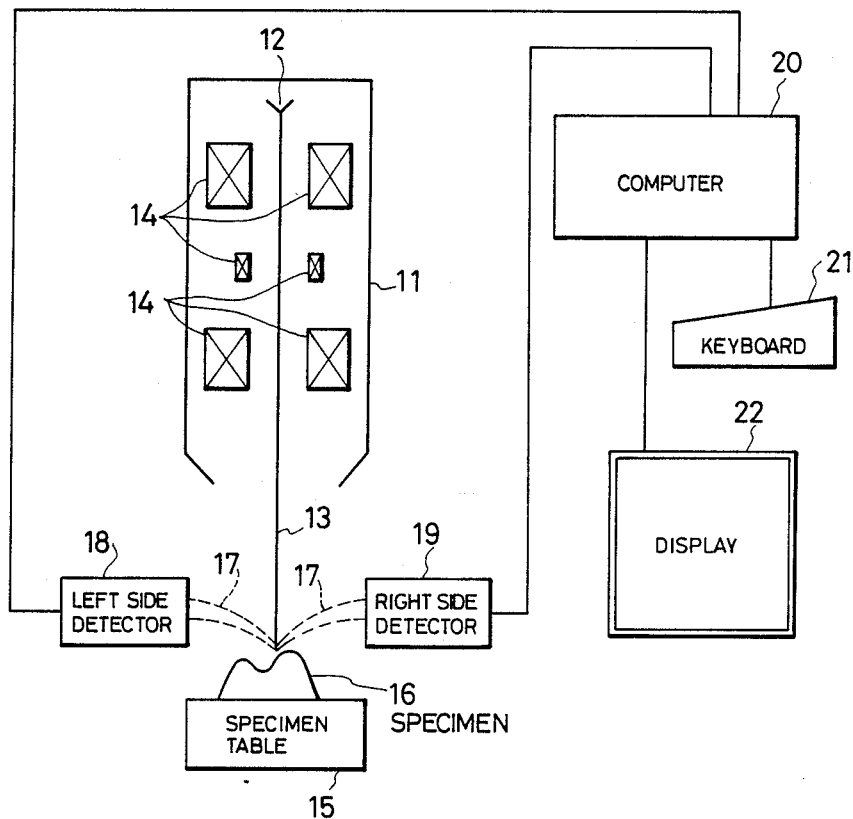
FIG. 2 is a diagram illustrating the hardware structure of a device for measuring sectional shape in which two secondary electron detectors are attached to the SEM according to the first embodiment of the present invention.

FIG. 2 is a diagram illustrating the hardware structure of a device for measuring the sectional shape in which two secondary electron detectors are attached to the SEM according to an embodiment of the present invention. An electron beam 13 emitted from an electron gun 12 in a column 11 is converged and deflected by an electron lens system 14 and falls on a specimen on a specimen table 15. The specimen 16 then emits secondary electrons 17 which are detected by a left side detector 18 and a right side detector 19.

The signals are processed by a computer 20 which operates in accordance with instructions from a keyboard 21 with the signals of the detectors or the processed results are indicated on a display 22.

FIG. 1 is a flow chart of the processing according to the above-mentioned embodiment. A block 31 inputs scanned signals sent from the left side detector and the right side detector. A block 32 calculates the gradient of a surface element relying upon the input signals. This embodiment makes use of the following equation, $$A = k \frac{I_L - I_R}{I_L + I_R} \qquad (5)$$

where k is a constant that has been determined in advance by calibration.

Namely, the sample of which the sectional shape has been known is measured to find values that represent the shape most faithfully.

A block 33 integrates the gradients starting from the end. The integration is carried out using the system employed in the conventional technology. A block 34 displays the result.

According to this embodiment, the gradient A can be correctly found even when there exists different materials or even when there exists peculiar shape such as edge. Even in such cases, therefore, the sectional shapes can be correctly obtained.

Figure 4:
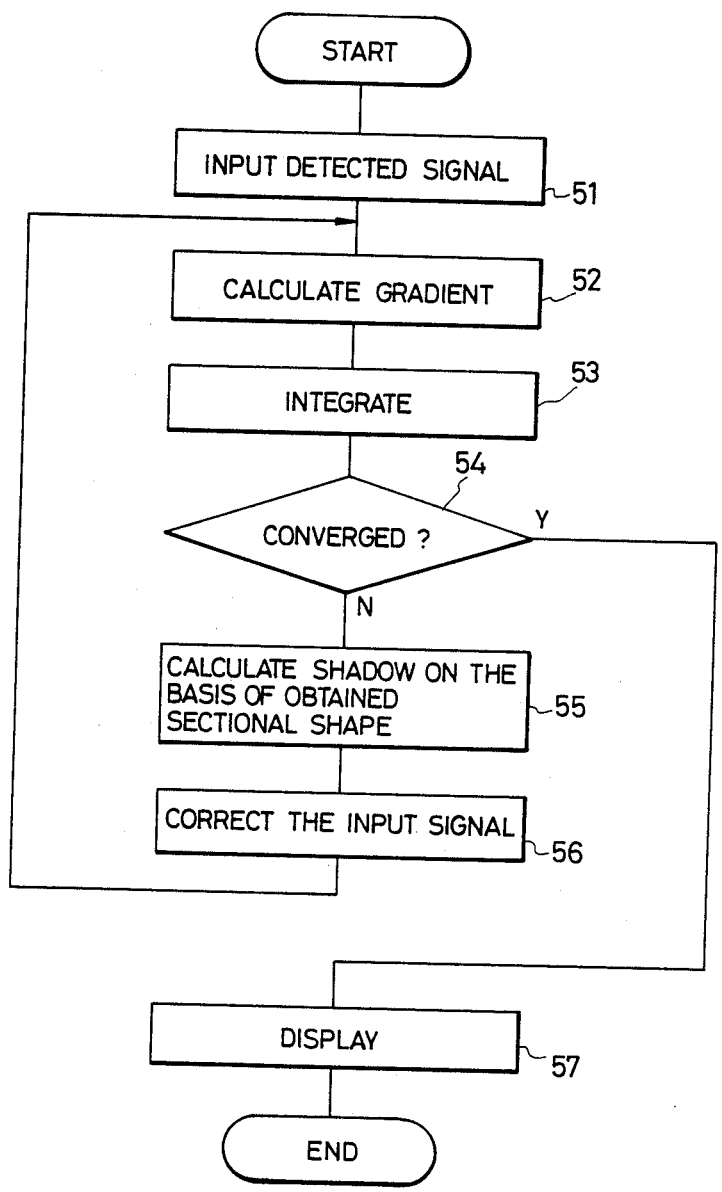
FIG. 4 is a flow chart of the processing according to a second embodiment of the present invention.

FIG. 4 is a flow chart of the processing according to another embodiment of the present invention. Blocks 51 and 52 perform the same processings as those of the blocks 31 and 32 of the aforementioned embodiment. The second embodiment makes use of the following equation.

$$A = k \frac{I_L - I_R}{I_L + I_R} \quad (5)$$

where k denotes a constant that has been determined in advance by calibration.

Namely, the sample of which the sectional shape has been known is measured to find values that represent the shape most faithfully.

A block 53 integrates the gradients starting from the end like the block 33 in the aforementioned embodiment. The integration is carried out using the system employed in the conventional technology mentioned earlier. A block 54 evaluates the differrence between the sectional shape calculated in the previous time and the sectional shape calculated this time while the calculation is being repeated, and determines that the sectional shape has converged when the difference lies within a predetermined range.

This determination is effected by, for example, calculating the summation of the square of differences among the points of the sectional shapes, and relying upon whether the thus calculated value is smaller than a value that has been determined in advance. In the calculation of the first time, however, it is automatically so determined that the sectional shape is not converged since there is no calculation effected in the previous time. When the sectional shape has been converged, the program proceeds to a block 57 to display the result. When the sectional shape has not been converged, the program proceeds to a block 55 to calculate the shadow in compliance with the imaging principle.

Figure 3:
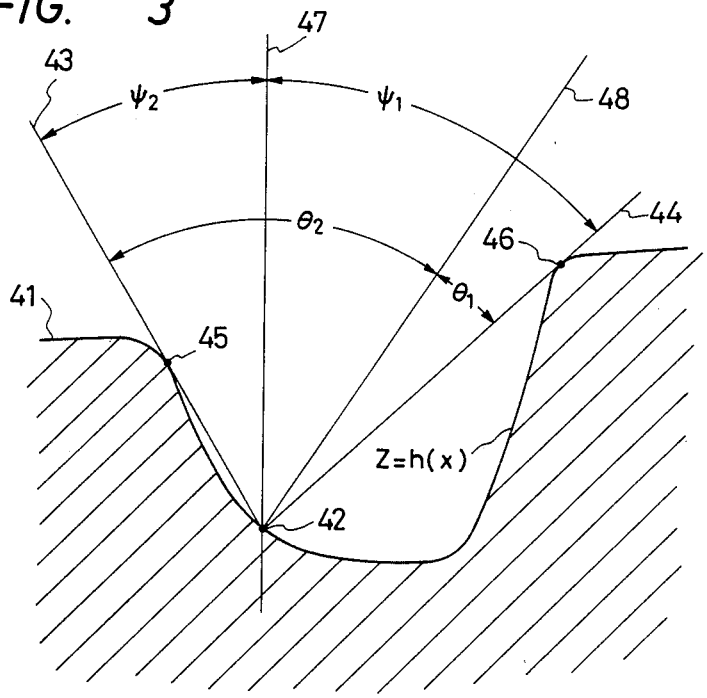
FIG. 3 is a diagram which explains the method of calculating the shadow.

An example of the calculation will now be described in conjunction with FIG. 3. In a section 41 of specimen of FIG. 3, a left tangent 43 and a right tangent 44 are drawn from a calculation point 42 at which the shade is to be found. The left tangent 43 and the right tangent 44 come into contact with a left point of contact 45 and a right point of contact 46. Here, angles subtended by a vertical line 47 drawn from the calculation point 42 and the left tangent 43 and the right tangent 44 are denoted by $\psi_2$ and $\psi_1$, and the angles subtended by a normal 48 drawn from the calculation point 42 and the left tangent 43 and the right tangent 44 are denoted by $\theta_2$ and $\theta_1$. Then, the left side detector 18 and the right side detector 19 detect secondary electrons within the above-mentioned angular ranges $\psi_2$ and $\psi_1$.

The amounts of secondary electrons detected by the left side detector 18 and the right side detector 19 are multiplied by $C_L$ and $C_R$ times, respectively, in accordance with the following equations, $$C_R = \frac{\sin \theta_1 - \frac{h'}{\sqrt{1 + h'^2}}}{1 - \frac{h'}{\sqrt{1 + h'^2}}} \quad (9)$$

$$C_L = \frac{\sin \theta_2 + \frac{h'}{\sqrt{1 + h'^2}}}{1 + \frac{h'}{\sqrt{1 + h'^2}}} \quad (10)$$

where h' denotes a gradient (h'=dh/dx) at the calculation point 42 in a plane which includes a section to be treated.

This calculation is effected for each of the points at which the sectional shape is to be calculated. A block 56 divides the input signals by $C_L$ and $C_R$, respectively. The program then returns to the block 52.

The processing is performed repetitively from the block 52 through up to the block 56. When it is determined by the block 54 that the sectional shape has converged, the program proceeds to the block 57 to display the result.

According to the above-mentioned embodiment, the sectional shape can be obtained correctly even when there exists great unevenness on the surface of the specimen so as to develop shadow.

What is claimed is:

1. In a method for measuring a sectional shape to determine the sectional shape of a subject on a plane which includes a direction coupling a plurality of detectors, each detector detecting an image intensity of the same subject irradiated from one direction by an energy beam, the improvement comprising the steps of:
    calculating a gradient component of a surface element of the subject in the direction coupling the plurality of detectors, on the basis of image intensities for one point detected by the plurality of detectors, utilizing a rationally homogeneous function of the image intensities so that the calculated gradient component is not affected by a change of surface material and an inclination of said surface of the subject; and
    determining, in accordance with the calculated gradient component, the sectional shape of the subject on a plane that includes the direction coupling the plurality of detectors and the surface element.

2. A method according to claim 1, wherein the rationally homogeneous function has a numerator and denominator of the same order.

3. A method according to claim 1, wherein the step of determining the sectional shape includes integrating the calculated gradient components.

4. A method according to claim 1, further comprising the steps of utilizing a scanning electron microscope emitting an electron beam as the energy beam irradiating the subject, and simultaneously detecting the image intensities by the plurality of detectors.

5. A method according to claim 1, further comprising the step of correcting distortion in the determined sectional shape caused by a shadow of the surface topography of the surface element by repeating the following three sub-steps:
    (1) estimating the shadow produced by the determined sectional shape;
    (2) estimating a signal value when the shadow is removed; and (3) calculating the sectional shape from the signal value having the effect of the shadow removed therefrom.

6. A method according to claim 5, wherein the detected image intensities are obtained by scanning.

7. A method according to claim 5, wherein the substep (1) includes calculating the amount of energy media emitted from the surface element and which is prevented from being detected by the detectors due to an uneven surface of the subject.

8. In a method for measuring a sectional shape to determine the sectional shape of a subject on a plane which includes a direction coupling a plurality of light sources, on the basis of at least two image intensities of the same subject detected from one direction and corresponding to the respective light sources, the improvement comprising the steps of:

calculating a gradient component of a surface element of the subject in the direction coupling the plurality of light sources, on the basis of the detected image intensities for one point, utilizing a rationally homogeneous function of the detected image intensities corresponding to the respective light sources so that the calculated gradient component is not affected by a change of surface material and an inclination of the surface of the subject; and determining, in accordance with the calculated gradient component, the sectional shape of the subject on a plane that includes the direction coupling the plurality of light sources and the surface element.

9. A method according to claim 8, wherein the rationally homogeneous function has a numerator and denominator of the same order.

10. A method according to claim 8, wherein the step of determining the sectional shape includes integrating the calculated gradient components.

11. A method according to claim 8, further comprising the step of correcting distortion in the determined sectional shape caused by a shadow of the surface topography of the surface element by repeating the following sub-steps:

(1) estimating the shadow produced by the determined sectional shape;

(2) estimating a signal value when the shadow is removed; and (3) calculating the sectional shape from the signal value having the effect of the shadow removed therefrom.

12. A method according to claim 11, wherein the detected image intensities are obtained by scanning.

13. In a system for measuring a sectional shape to determine the sectional shape of a subject on a plane that includes a direction coupling a plurality of detectors, each detector detecting an image intensity of the same subject irradiated from one direction by an energy beam, the improvement comprising:

means for calculating a gradient component of a surface element of the subject in the direction coupling the plurality of detectors, on the basis of image intensities for one point detected by the plurality of detectors, utilizing a rationally homogeneous function of the image intensities so that the calculated gradient component is not affected by a change of surface material and an inclination of the surface of the subject; and means for determining, in accordance with the calculated gradient component, the sectional shape of the subject on a plane that includes the direction coupling the plurality of detectors and the surface element.

14. A system according to claim 13, wherein the rationally homogeneous function has a numerator and denominator of the same order.

15. A system according to claim 13, wherein the means for determining the sectional shape includes means for integrating the calculated gradient components.

16. In a system for measuring a sectional shape to determine the sectional shape of a subject on a plane which includes a direction coupling a plurality of light sources, on the basis of at least two image intensities of the same subject detected from one direction and corresponding to the respective light sources, the improvement comprising:

means for calculating a gradient component of a surface element of the subject in the direction coupling the plurality of light sources, on the basis of the detected image intensities for one point, utilizing a rationally homogeneous function of the detected image intensities corresponding to the respective light sources so that the calculated gradient component is not affected by a change of surface material and an inclination of the surface of the subject; and means for determining, in accordance with the calculated gradient component, the secitonal shape of the subject on a plane that includes the direction coupling the plurality of light sources and the surface element.

17. A system according to claim 16, wherein the rationally homogeneous function has a numerator and denominator of the same order.

18. A system according to claim 16, wherein the means for determining the sectional shape includes means for integrating the calculated gradient components.

* * * * *